United States Patent [19]

Keir et al.

[11] Patent Number: 4,811,190
[45] Date of Patent: Mar. 7, 1989

[54] CAPACITIVE BOOST CIRCUIT FOR EXTENDING HOLD UP TIME

[75] Inventors: Alexander S. Keir, Chelmsford; John C. Berry, Haverhill, both of Mass.

[73] Assignee: Digital Equipment Corporation, Maynard, Mass.

[21] Appl. No.: 169,091

[22] Filed: Mar. 3, 1988

Related U.S. Application Data

[63] Continuation of Ser. No. 95,031, Sep. 9, 1982, abandoned.

[51] Int. Cl.⁴ .............................................. H02M 3/18
[52] U.S. Cl. ...................................... 363/60; 363/50; 307/110
[58] Field of Search .................. 363/50, 59, 60, 61, 363/124; 309/109, 110; 320/1

[56] References Cited

U.S. PATENT DOCUMENTS

| | | | |
|---|---|---|---|
| 3,161,778 | 8/1960 | Harrison et al. | 307/77 |
| 3,371,232 | 2/1968 | Hannan et al. | 363/59 X |
| 3,459,957 | 7/1967 | Kelley | 307/77 |
| 3,505,586 | 8/1970 | Dulin | 307/110 |
| 3,582,719 | 6/1969 | Stuckens | 307/110 |
| 3,753,001 | 8/1973 | Hiroshima et al. | 307/109 |
| 3,757,795 | 9/1973 | Anderson | 307/110 |
| 3,962,591 | 6/1976 | Popka | 363/60 X |
| 4,016,476 | 4/1977 | Morokawa et al. | 363/60 |
| 4,315,162 | 2/1982 | Ferguson | 307/66 |
| 4,636,930 | 1/1987 | Bingham et al. | 363/60 |

Primary Examiner—Peter S. Wong
Attorney, Agent, or Firm—Nutter, McClennen & Fish

[57] ABSTRACT

A circuit for extending the operation of an electrical load after interruption of its power source. The circuit includes bulk capacitors charged by the power source and regulated to a predetermined voltage near their peak-voltage rating. The bulk capacitors are isolated from the power source capacitors during normal power source operation. When the power source is interrupted, the bulk capacitors are used to hold-up the load. The circuit obtains maximum hold-up time for a given physical bulk capacitor size, while also providing a consistent hold-up time over a range of power source voltages.

10 Claims, 4 Drawing Sheets

CAPACITIVE BOOST CIRCUIT FOR EXTENDING HOLD UP TIME

This application is a continuation of application Ser. No. 095,031 filed Sept. 9, 1987, now abandoned.

BACKGROUND OF THE INVENTION

This invention relates generally to the field of electrical power supplies and more particularly to a capacitive boost circuit for lengthening the time available for a computer to execute a power down sequence when its power source is interrupted.

A problem encountered with many electronic systems and especially computers is an interruption of the operation of their power source. Such an interruption can cause loss of information stored in volatile memories and make it difficult, if not impossible, to restore the computer to its preinterruption state. If the interruption is detected early enough, a power down sequence can be executed to store the contents of vital operational components, such as the program counter, address registers, instruction registers, stack pointers, and cache, in non-volatile memory. The contents of these operational components can then be restored upon return of adequate power.

Although computers normally operate with a nominal power source voltage level, they can properly operate at power source voltage levels ranging from a maximum operating voltage down to a minimum operating voltage. One way to detect a likely power source interruption, then, is to sense when the power source voltage level drops to a minimum normal voltage. The minimum normal voltage is selected to be somewhat greater than the minimum operating voltage. If the power source voltage level drops to the minimum normal voltage, the computer's normal operation is interrupted. The power down sequence is then executed, and, it is hoped, completed before the power source voltage level drops to the minimum operating voltage. The time available for the power down sequence, which is the time it takes for the power source voltage level to drop from the minimum normal voltage to the minimum operating voltage, is called the hold-up time.

For new, advanced computers having more operational components, it becomes necessary to increase hold-up time. One way to lengthen hold-up time is to connect an electrolytic bulk capacitor in parallel with the power source. The bulk capacitor stores electrical energy (that is, it is charged) during normal operation of the power source. When the power source is interrupted, the stored energy is retrieved (that is, the bulk capacitor discharges) to provide the necessary energy to allow the computer to execute the power down sequence. With this arrangement, the length of time available for the power down sequence thus depends upon the amount of energy which can be retrieved from the bulk capacitor.

The amount of energy which can be retrieved from a capacitor depends upon the amount of energy stored and the proportion of stored energy that is extracted. The amount of energy stored in a capacitor depends upon its capacitance rating and the voltage level at which it is maintained. Thus, to increase hold-up time, either the bulk capacitor's capacitance or the voltage at which it is maintained must be increased. To increase capacitance, either a physically larger capacitor or additional capacitors must be used. On the other hand, if the voltage at which the capacitor is maintained is increased, the capacitor must be provided with a higher peak-voltage rating, which, in turn, also requires increased physical size. Accordingly, to increase hold-up time requires physically larger bulk capacitors.

Some circuits provide lengthened hold-up time by using a plurality of bulk capacitors. These capacitors are connected in parallel with the power source during its normal operation. When the power source voltage drops, the bulk capacitors are used to provide an elevated voltage to the load.

We have found that neither of these approaches makes maximum efficient use of the bulk capacitor's storage capability. Specifically, since the bulk capacitors are connected in parallel with the power source, they must have a peak-voltage rating at least as high as the maximum voltage provided by the power source. Because they usually begin to discharge from near the nominal power source voltage, only a fraction of the energy retrieved from them is used during hold-up time. In particular, only the energy retrieved from the bulk capacitor while the power source voltage level is dropping from the minimum normal voltage to the minimum operating voltage is truly available to lengthen hold-up time. Otherwise stated, the energy which the capacitor supplies while discharging from the nominal power source voltage to the minimum normal voltage is not used to lengthen hold-up time.

Another problem occurs with such circuits during a cut back in the power available from the local utility. In such a situation, known as a power brown-out, the power source may provide a reduced voltage above the minimum normal voltage but below the nominal power source voltage. This reduced voltage is sufficient to power the computer but may be insufficient to fully charge the bulk capacitors. The amount of hold-up energy retrieved from the bulk capacitors in this situation may be insufficient to sustain the computer for the entire power down sequence.

SUMMARY OF THE INVENTION

It is thus an object of this invention to provide a capacitive boost circuit that provides the maximum hold-up time for a given bulk capacitor physical size without adversely affecting reliability.

Another object is to provide a boost circuit exhibiting consistent hold-up time over a range of power source voltages.

In brief summary, the invention is a capacitive boost circuit featuring a bulk capacitor unit, a regulating circuit which maintains the bulk capacitor unit at a voltage at least as high as a minimum normal voltage, and a switch circuit which connects the bulk capacitor unit to the load when the voltage level from the power source decreases to the minimum normal voltage.

The bulk capacitor unit can include one, two, or more capacitors. For example, if two bulk capacitors are used, each is charged to at least one-half the minimum normal voltage. A switch forming part of the switch circuit is connected between the two bulk capacitors. The switch is normally kept open so that each bulk capacitor can be charged by the power source. When the voltage level from the power source decreases to the minimum normal voltage, the switch is closed. This connects the bulk capacitors in series with each other and in parallel with the load.

There are a number of advantages to the foregoing arrangement. With this invention, most of the available bulk capacitor energy is used to provide hold-up time. Specifically, as the voltage on the bulk capacitors is regulated to near the minimum normal voltage, their peak voltage rating can be lower than the power source voltage. Because the bulk capacitors provide hold-up energy beginning at a voltage nearer their peak-voltage rating, more hold-up energy is extracted for a given bulk capacitor size. Thus, hold-up time has been increased without increasing bulk capacitor voltage or physical size, and without decreasing the reliability of the boost circuit.

Additionally, the switch circuit effectively isolates the bulk capacitors from each other and the load during normal operation of the power source. A diode may also isolates the bulk capacitors from the power source when the bulk capacitors are used to supply energy to the load. This minimizes the amount of energy required to maintain the full charge on the bulk capacitors, and also maximizes the amount of energy provided to the load by the bulk capacitors.

If reliability is less important than capacitor size, the required hold-up energy can be extracted from a bulk capacitor having a lower capacitance but with a voltage rating even higher than the nominal power source voltage. These higher rated capacitors are charged and regulated to this higher voltage.

A dependable amount of hold-up energy is provided to the load, regardless of fluctuations in the power source voltage, because the voltage on the bulk capacitors is regulated.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF ILLUSTRATIVE EMBODIMENTS

Figure 1:
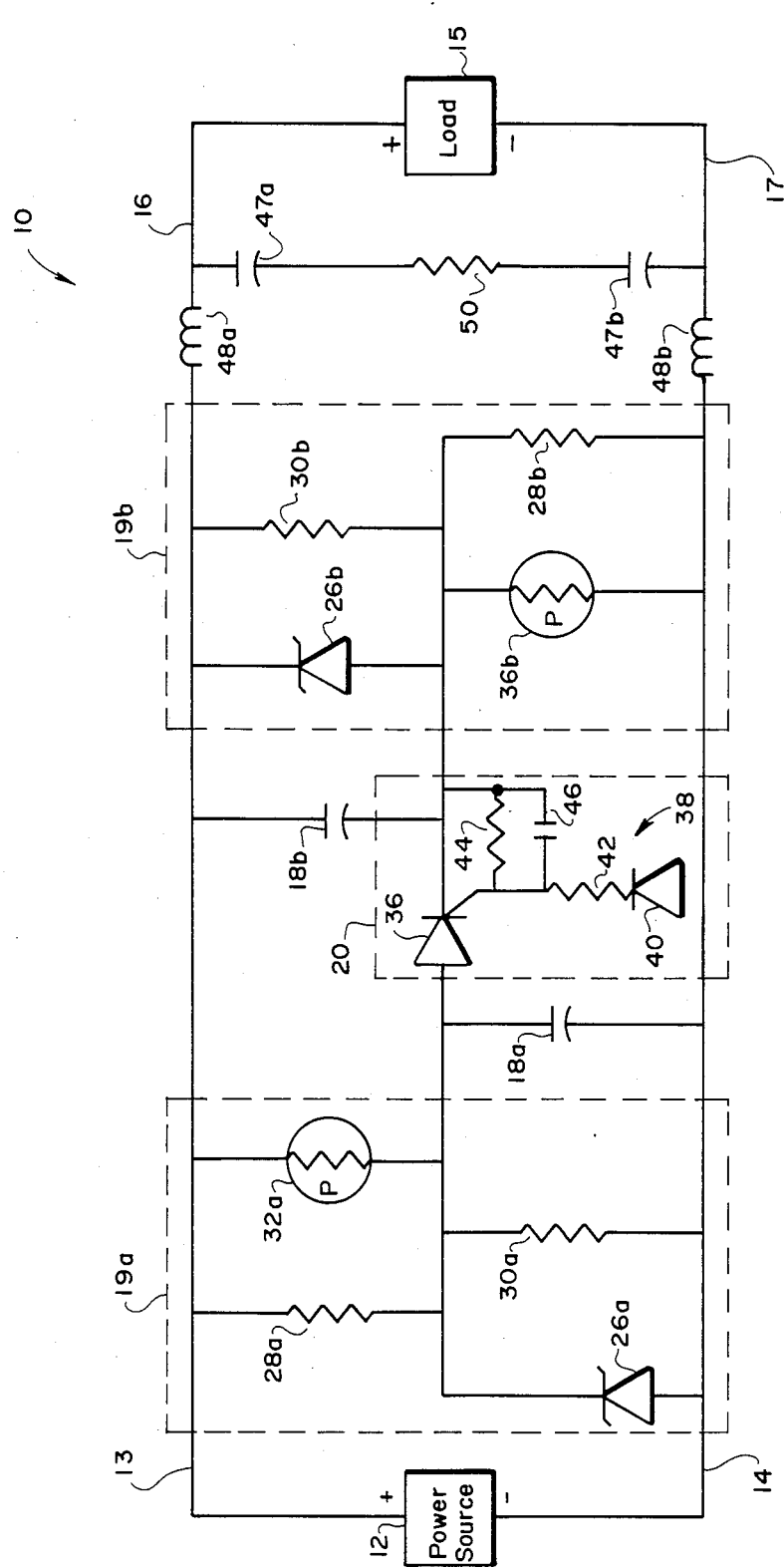
FIG. 1 is a schematic of one embodiment of a boost circuit according to the invention.

FIG. 1 depicts a capacitive boost circuit 10 according to the invention. Boost circuit 10 is coupled between a direct current (DC) power source 12 and a load 15 such as a digital computer. Boost circuit 10 includes a bulk capacitive unit, such as two bulk capacitors 18a and 18b (collectively referred to by reference numeral 18), connected to the power source 12, a like number of regulators 19a and 19b (collectively referred to by reference numeral 19), for charging and maintaining the voltage on the bulk capacitors 18, and a switch circuit 20 connected between the bulk capacitors 18. Switch circuit 20 serves to isolate the bulk capacitors 18 from the load 15 during normal operation of the power source 12 and connects them to the load 15 when power source 12 is interrupted. Boost circuit 10 thus operates on an input or power source voltage provided by power source 12 to provide an output or load voltage having an extended hold-up time to the load 15.

In the illustrative embodiment, two electrolytic bulk capacitors 18a and 18b are used. Bulk capacitor 18a has its negative terminal attached to a negative input line 14 and bulk capacitor 18b has its positive terminal coupled to the positive input line 13. The positive input line 13 and negative input line 14 of the boost circuit 10 are connected to corresponding positive and negative terminals of power source 12.

Regulators 19 control the voltage applied to the bulk capacitors 18. In particular, each regulator 19 regulates the voltage on its associated bulk capacitor 18 to a predetermined voltage level. The voltage on the bulk capacitors 18 thus remains at the predetermined voltage level, even after the input voltage from power source 12 begins to decrease from a nominal power source voltage to a minimum operating voltage.

An exemplary regulator 19a thus includes a zener diode 26a, having a zener voltage equal to the predetermined voltage, connected in parallel with the bulk capacitor 18a. The zener voltage of zener diode 26a is selected so that when the bulk capacitors 18 are connected to the load 15 through the switch circuit 20, an elevated voltage level greater than the minimum operating voltage is provided to the load 15 by the bulk capacitors 18.

The zener voltage must also be selected to insure that this elevated voltage level is below a maximum operating voltage, to avoid damaging the load 15. Thus, if more than one bulk capacitor 18 is used, the zener voltage of the zener diode associated with each regulator 19 is chosen to be a fraction of the maximum operating voltage.

Regulator 19a also regulates the current which is applied to charge bulk capacitor 18a. In particular, a positive temperature coefficient thermistor 32a is connected between the positive input line 13 and the cathode of zener diode 26a. Upon initial energization of power source 12, thermistor 32a operates at a constant low resistance to allow quick charging of bulk capacitor 18a from power source 12. After a time, the temperature of thermistor 32a will rise, due to self-heating. The increasing resistance with temperature characteristic of thermistor 32a tends to reduce the current fed to zener diode 26a. During this period, the combination of resistor 28a, thermistor 32a and zener diode 26a thus provides a small current which is approximately constant with temperature to keep capacitor 18a charged to the predetermined voltage.

If desired, a resistor 30a may be connected in parallel with zener diode 26a. Resistor 30a serves as a discharge path for capacitor 18a when the power source 12 is disconnected, thereby making the boost circuit 10 safer to service.

Regulator 19b, which is similar to regulator 19a includes zener diode 26b, thermistor 32, and resistors 28b and 30b. It is arranged to charge capacitor 18b from the positive terminal of power source 12, however.

Switch circuit 20 includes a switching element, such as a silicon controlled rectifier (SCR) 36, connected between bulk capacitors 18a and 18b, and a control circuit 38. Other types of switching elements, such as power transistors, may be used as long as their power rating is sufficient to handle a current surge that occurs when bulk capacitors 18a and 18b are used to provide energy to the load 15, as described below.

Control circuit 38 includes a diode 40 whose anode is connected to the negative input line 14, a control resistor 42 connected between the cathode of diode 40 and the control input of SCR 36, and a cathode resistor 44 attached between the control input terminal and cathode of SCR 36.

In operation, the control circuit 38 normally maintain SCR 36 in an off, or non-conducting condition, and thus isolates bulk capacitors 18 from each other and the load 15. Upon interruption of the power source 12, SCR 36 turns on to connect the bulk capacitors 18a and 18b in series with each other across the input lines 13 and 14.

More particularly, in normal operation, the input voltage from power source 12 is used to supply power to the load 15. Bulk capacitors 18 are also charged during normal operation of the power source 12. At this point, the output voltage appearing across the output lines 16 and 17 exceeds the voltage on the bulk capacitor 18b. This biases diode 40 in the off state, thereby preventing current from flowing to the control input terminal of SCR 36, and thus keeping SCR 36 in the non-conducting state.

After the power source 12 is interrupted, the input voltage from power source 12 will at some point decrease enough to cause the output voltage across output lines 16 and 17 to become lower than the voltage on bulk capacitor 18b. Diode 40 then becomes forward-biased, which turns SCR 36 on. This has the effect of connecting the bulk capacitors 18 in series with each other as well as to connect them to the output lines 16 and 17.

In this manner, the bulk capacitors 18 are kept fully charged but isolated from the load 15 during normal operation of power source 12. The bulk capacitors 18 are connected to provide energy to the load 15 only when needed, at the beginning of the hold-up time.

Alternatively, the two bulk capacitors 18a and 18b can be regulated to provide a combined voltage even higher than the nominal power source voltage, if their peak-voltage rating is increased accordingly. Because hold-up time varies as the square of peak-voltage rating, this maximizes the hold-up time for a given physical size of bulk capacitors 18. A diode (not shown in FIG. 1) should also be used in this situation to prevent damage to the power source 12. The anode of the diode is connected to the positive terminal of the power source 12, and the cathode of the diode is connected to the regulator 19a, at the junction of the resistor 28a and thermistor 32a.

If higher reliability is more important, the voltage on the bulk capacitors 18 can be regulated so they provide a combined voltage lower than the minimum normal voltage. For example, in the extreme, each of two bulk capacitors 18a and 18b need only be regulated to a voltage equal to one-half the minimum normal voltage.

However, when the bulk capacitors 18a and 18b are connected in series, it may be preferable to provide a total voltage near the minimum normal voltage even if the input voltage from the power source 12 is much lower than the nominal power source voltage, as may be the case during a brown-out. If this is desired, the bulk capacitors are regulated to normally provide a voltage higher than the minimum normal voltage.

Regardless of the voltage at which the bulk capacitors are regulated, their peak-voltage rating is selected to be near the voltage at which they are regulated.

Alternatively, the boost circuit 10 may employ only one bulk capacitor 18a. If this is done, the bulk capacitor 18a is controlled by a single regulator 19a that maintains the voltage across it at a predetermined voltage near the nominal power source voltage. In this situation, the single regulator 19a may require its own voltage step-up circuit (not shown) to insure it receives this higher voltage even when the input voltage from power source 12 becomes lower than nominal. In this situation, the switch circuit 20 is still needed to insure that the single bulk capacitor 18a remains isolated from the load 15 until the input voltage from power source 12 drops to the minimum normal voltage.

A filter capacitor 46 may be coupled in parallel with cathode resistor 44. The filter capacitor 46 provides hysteresis in the switching of SCR 36 to prevent premature or oscillatory switching which might result in less energy being available to power load 15.

As is conventional, supply capacitors 47a and 47b may also be connected across the output lines 16 and 17. The supply capacitors 47a and 47b are used to sustain the output voltage during very short reductions in the power source voltage. Accordingly, the supply capacitors 47a and 47b can have a much smaller capacitance than the bulk capacitors 18. The switch control circuit 38 will still operate properly, because the supply capacitors 47a and 47b will discharge before the bulk capacitors 18 are switched in.

Inductors such as inductor 48a or inductor 48b may be disposed in series between the input lines 13 and 14 and the supply capacitors 47a and 47b. Their impedance values are chosen so the switching of bulk capacitors 18 is critically damped, taking into account the capacitance of the supply capacitors 47a and 47b.

A resistor 50 can be connected between the supply capacitors 47a and 47b to limit current during the switching of bulk capacitors 18.

A specific example of the advantage of this arrangement follows. As previously mentioned, the bulk capacitors 18 may have a lower peak-voltage rating but provide even more hold-up time for a given total physical size. For example, prior bulk capacitors were charged by connecting them directly between the power source 12 and the load 15. They typically began to discharge as the power source voltage decreased during an interruption, but they did not provide hold-up energy until the power source voltage dropped to near a minimum normal voltage. The minimum normal voltage is typically set to 50% of the maximum operating voltage. These prior bulk capacitors then continued to discharge, thereby providing energy to the load 15 during hold-up time. This continued until the voltage on the bulk capacitors reached the minimum operating voltage, typically set to 40% of the maximum operating voltage.

Thus, since their peak-voltage rating needed to be at least as high as the maximum operating voltage, these prior bulk capacitors provided hold-up energy while discharging from 50% to 40% of their peak-voltage rating. Because the energy stored in a capacitor varies as the square of the voltage across it times its capacitance, this arrangement extracted $(50\%)^2 - (40\%)^2$ or only 9% of the full bulk capacitor charge during the hold-up time.

In a capacitive boost circuit 10 in accordance with this invention, while the bulk capacitors 18 are also used while the voltage to the load is being reduced from the same 50% to 40% of the maximum operating voltage, they can have a lower peak-voltage rating. In fact, their peak-voltage rating can be as small as one-half the minimum normal voltage. Since they are neither coupled to the load 15 nor directly across the power source 12 until the power source voltage drops to the minimum normal voltage, they will discharge from 100% to 40% of their peak rating. Thus $(100\%)^2 - (40\%)^2$ or 84% of the available stored energy is extracted during hold-up time. In most practical applications, however, because of component tolerances, the peak-voltage rating of the bulk capacitors 18 must be about 5% higher than the maximum operating voltage. This still means that approximately $(95\%)^2-(40\%)^2$ or 74% of the available energy can be used.

It will be appreciated by those skilled in the art that in the new capacitive boost circuit 10 depicted in FIG. 1, the bulk capacitors 18 are fully charged even when only a reduced input voltage is available from the power source 12. As long as the input voltage from power source 12 is at least equal to the zener voltage of diodes 26a and 26b, the desired energy will be provided consistently during the hold-up time.

Figure 2A:
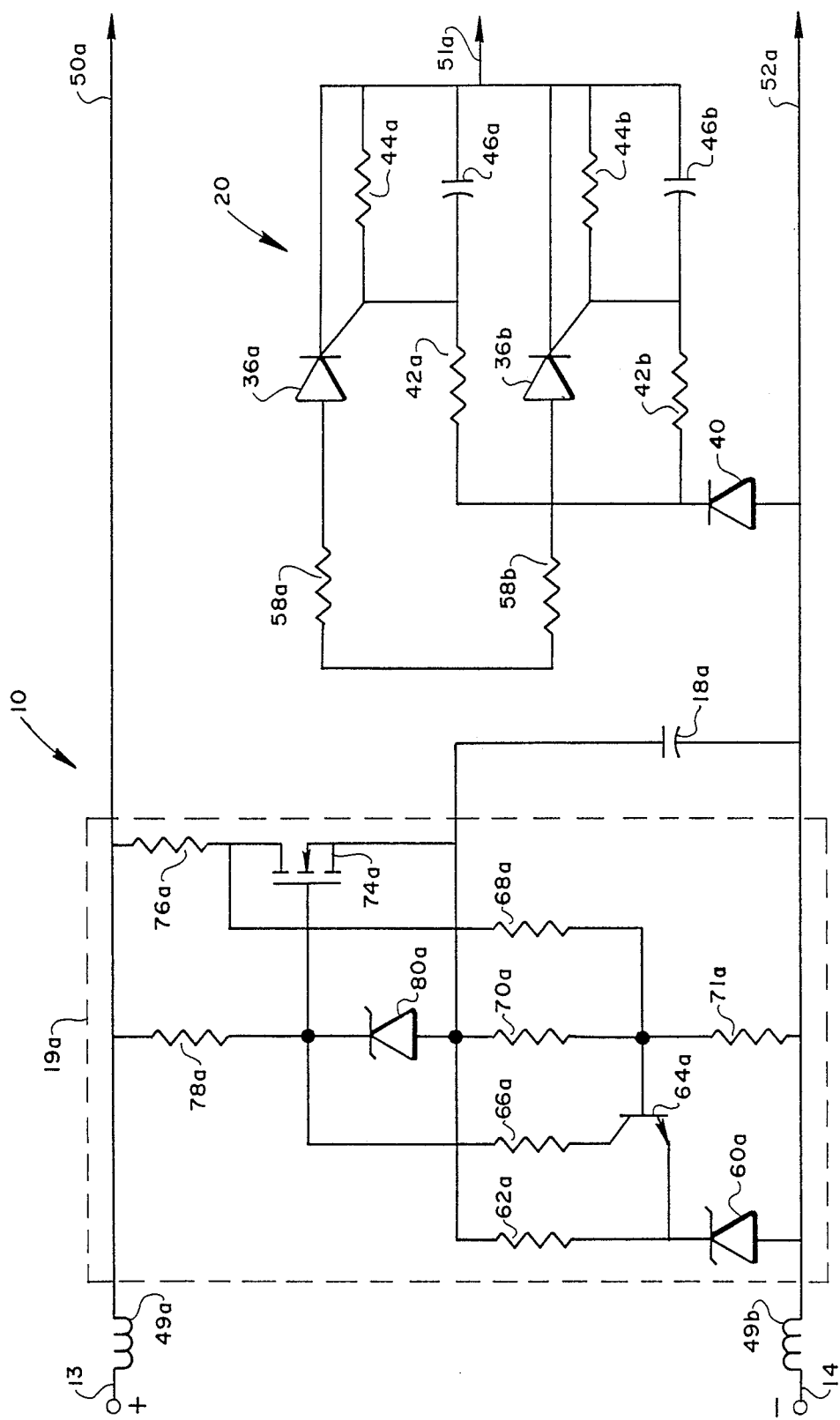
FIGS. 2A and 2B are a schematic show several possible variations of the boost circuit.
Figure 2B:
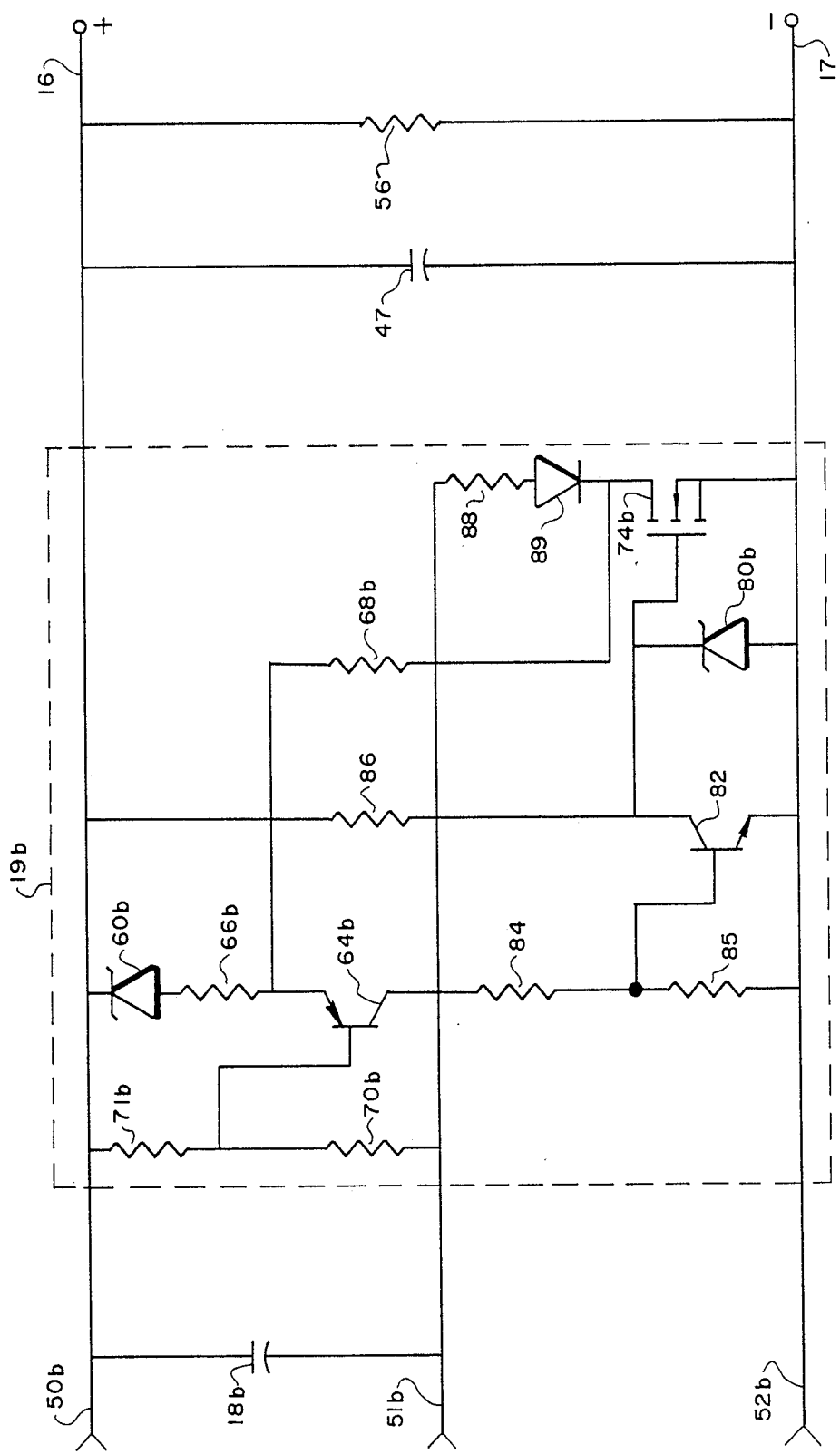

FIGS. 2A and 2B show another embodiment of the invention. They should be viewed as a single schematic diagram with FIG. 2A to the left of FIG. 2B, so that alignment points 50a, 51a, and 52a of FIG. 2A are next to points 50b, 51b, and 52b of FIG. 2B. The regulator 19a of FIG. 2A is a transistor-type regulator, including a reference zener diode 60a, with its anode connected to the negative input line 14 through an inductor 49b, a series resistor 62a, connected between the cathode of zener diode 60a and capacitor 18a, and a comparison transistor 64a. The emitter terminal of comparison transistor 64a is connected to the cathode of zener diode 60, its collector terminal is connected to one lead of a collector resistor 66a, and its base terminal is connected to the junction of a pair of base biasing resistors 70a and 71a. Resistors 70a and 71a form a voltage divider, as they are connected across the positive and negative terminals of bulk capacitor 18a. The source terminal of a switching transistor 74a is connected to the positive terminal of bulk capacitor 18a. Its drain terminal is connected through a drain resistor 76a and an inductor 49a to the positive input line 13. The gate terminal of transistor 74a is connected, through gate biasing resistor 78a, to an inductor 49a and to the collector of comparison transistor 64a, through a collector resistor 66a. The anode of a zener diode 80a is connected to the source of transistor 74a and its cathode is connected to the gate of transistor 74a. A high resistance precision resistor 68a is connected between the drain of transistor 74a and the base of transistor 64a.

In operation, comparison transistor 64a operates to compare a fixed fraction of the voltage across bulk capacitor 18a with the voltage across reference zener diode 60a. If the voltage across the bulk capacitor 18a is greater, which indicates that its charge is adequate, the comparison transistor 64a switches on to enable current to flow through resistor 66a. This in turn causes switching transistor 74a to turn off. Zener diode 80a limits the gate to source voltage on transistor 74a so that it remains within its reverse-biased and forward-biased rating.

On the other hand, when the fixed fraction of the voltage across capacitor 18a becomes less than the voltage of reference zener 60, comparison transistor 74a turns off, thereby turning switching transistor 74a on, which in turn allows current to flow to the positive terminal of bulk capacitor 18a. This increases the charge on bulk capacitor 18a.

Using the thermistor-type regulator 19a of FIG. 1 necessitates a trade-off in the selection of thermistor 32a. If a low-resistance thermistor 32a is used, the bulk capacitor 18a charges more quickly, but if a high-resistance thermistor 32a is used, the boost circuit 10 uses less energy to keep the bulk capacitor 18a charged. Using the transistor-type regulator 19a of FIG. 2A avoids this trade-off, because the transistor 74a provides a low-resistance charging path to bulk capacitor 18a. The current needed to maintain the bulk capacitor charge is also minimized by the embodiment of FIG. 2A, because transistor 74a turns on only when the bulk capacitor 18a needs to be recharged. Resistor 68a provides positive feedback to create hysteresis in the switching action of transistor 74a. This minimizes the time that switching transistor 74a operates in its linear region, to further insure it is always completely on or off. Also, more of the charge on capacitor 18a is provided to the load 15 when SCR 36 is activated, because when switching transistor 74a turns off, a very high impedance is placed between bulk capacitor 18a and power source 12.

The embodiment of regulator 19b shown in FIG. 2B is similar to regulator 19a of FIG. 2A. There, a comparison transistor 64b compares a fixed fraction of the voltage on bulk capacitor 18b with that of a zener diode 60b, using base biasing resistors 70b and 71b. The collector of comparison transistor 64b is connected through auxiliary biasing resistors 84 and 85 to the base of an auxiliary transistor 82. A collector resistor 86 is connected between the collector of auxiliary transistor 82 and the positive output line 16. The collector of transistor 82 is connected to the base of switching transistor 74b. A zener diode 80b protects switching transistor 74b just as diode 80a protects transistor 74a.

In operation, the voltage at the base of comparison transistor 64b is proportional to the voltage across bulk capacitor 18b. The voltage at the emitter of comparison transistor 64b is determined by zener diode 60b. If the voltage level of the emitter of comparison transistor 64b is less than voltage of its base, transistor 64b stays off. When comparison transistor 64b is off, auxiliary transistor 82 is also in an off condition, and thus switching transistor 74b remains on to charge bulk capacitor 18b.

After a time, the voltage across capacitor 18b increases to a point where the base-emitter junction of transistor 64b is sufficiently forward-biased to cause it to turn on. This also causes the base-emitter of auxiliary transistor 82 to become forward-biased. Switching transistor 74b then turns off to keep capacitor 18b from charging further.

A series resistor 88b and diode 89 connected between the drain of switching transistor 74b and the emitter of transistor 64b provides some hysteresis in the switching of transistor 64b.

The embodiment of FIGS. 2A and 2B uses a single supply capacitor 47. Additionally, a positive temperature coefficient thermistor 56 can be used for a discharge path for the bulk capacitors when the power source 12 is removed. Thermistor 56 provides a constant power discharge path to optimize discharge time while minimizing the wattage of the discharge path.

Inductors 49a and 49b serve a purpose similar to that served by inductors 48a and 48b in the embodiment depicted in FIG. 1. Inductors 49a and 49b are, however, placed adjacent the input lines 13 and 14. This avoids the tendency of inductors 48a and 48b of FIG. 1 to unnecessarily limit current flow when bulk capacitors 18 are providing power to the load 15. Of course, inductors 49a and 49b could be located as in the FIG. 1 embodiment just as inductors 48a and 48b could be located as in the FIGS. 2A and 2B embodiment. Ripple in the output voltage has been found to be lower with the inductors 49a and 49b in the position depicted in FIG. 2A, however.

It has also been found that manufacture of the switch circuit 20 is easier if multiple, small, parallel coupled SCRs 36a and 36b are used rather than one large SCR 36. In particular, component layout is easier and automatic insertion machines are more easily adapted to handle the smaller components. If this is done, a like multiple of control circuits 38 including multiple control resistors 42a and 42b, cathode resistors 44a and 44b, and filter capacitors 46a and 46b may be necessary.

If series resistors 58a and 58b are connected between the bulk capacitor 18a and SCRs 36a and 36b, they help to limit a current surge occurring when SCRs 36a and 36b are switched to the on state. Of course, the multiple control circuits or series resistors can be used with other embodiments of boost circuit 10.

Figure 3:
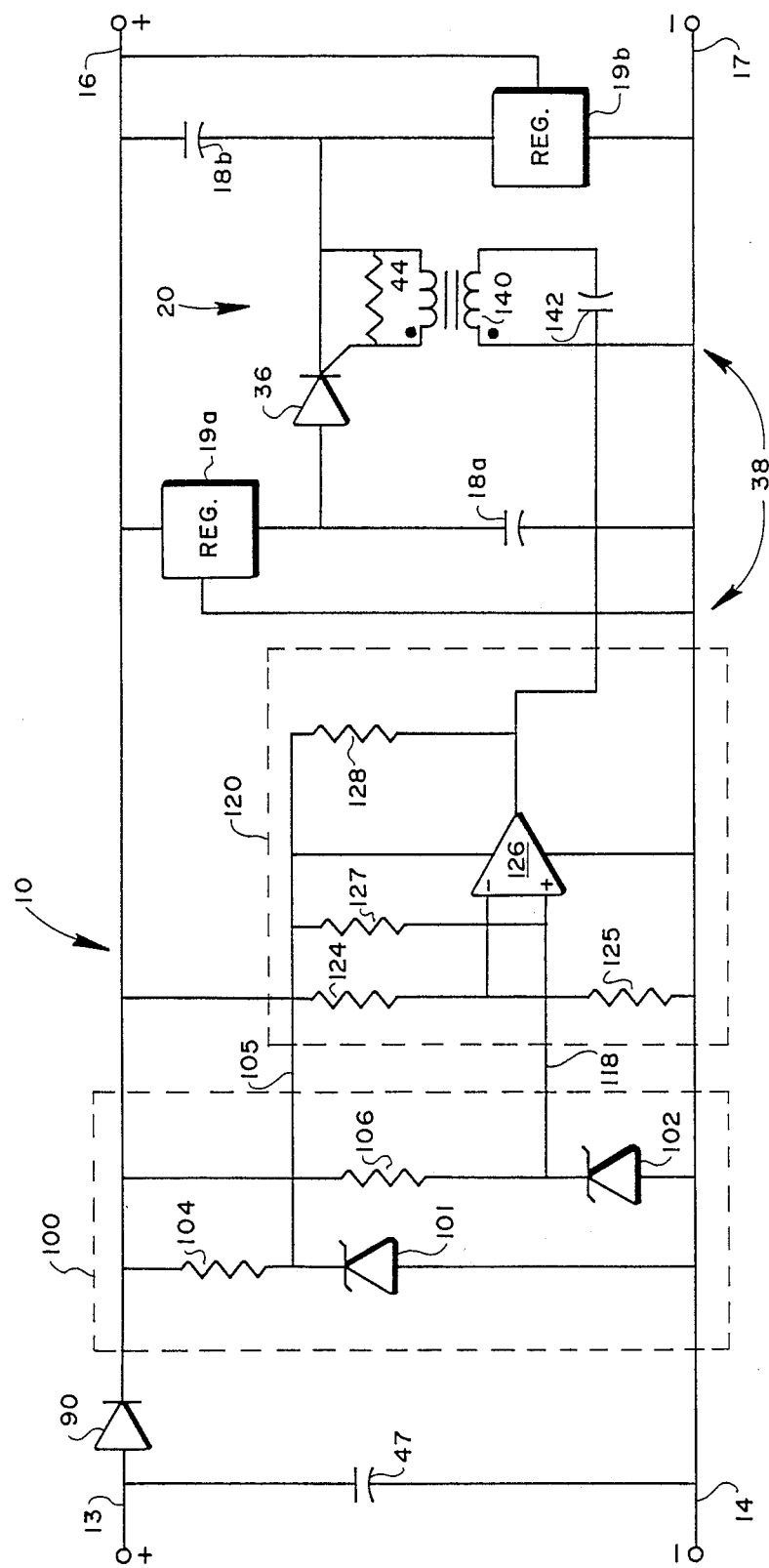
FIG. 3 is a schematic of another embodiment of the boost circuit.

FIG. 3 shows other possible variations of boost circuit 10. This embodiment includes a supply capacitor 47, bulk capacitors 18, associated regulators 19 coupled to the power source 12, an SCR 36 disposed between bulk capacitors 18, and a switch circuit 20 including a control circuit 38. However, capacitor 47 is directly connected between the input lines 13 and 14. The anode of a diode 90 is connected to the positive terminal of supply capacitor 47. Its cathode is connected to the positive output line 16. When SCR 36 is off, the diode 90 serves to insure that capacitors 18 provide energy only to the load 15 and not to the power source 12. This happens because when SCR 36 is on, bulk capacitors 18 appear in series across the cathode of diode 90 and supply capacitor 47. This reverse-biases diode 90. The use of diode 90 also has the advantage of not needing a series resistor 58 to limit surge current when SCR 36 is turned on. As previously mentioned connection with FIG. 1, this diode 90 also serves, when the voltage provided by the bulk capacitors is greater than the nominal power source voltage, to prevent any over-voltage from damaging the power source 12. However, some energy is lost through diode 90 during normal operation of the power source 12.

FIG. 3 also shows another embodiment of control circuit 38. This embodiment includes a reference and supply circuit 100, comparator 120, capacitor 142, transformer 140 and resistor 44. This control circuit 38 provides greater accuracy in the control current fed to SCR 36 and thus greater accuracy in the point at which it switches SCR 36 to the on state.

Reference and supply circuit 100 provides a supply voltage on a line 105 and a reference voltage on another line 118. A zener diode 101 provides the supply voltage 105. Its anode is connected to the negative input line 14, and its cathode is connected to a series resistor 104 shunted to the positive input line 13 through diode 90. Similarly, another zener diode 102 and shunt resistor 106 provide the reference voltage 118. The supply voltage on line 105 is used to provide power to components of the comparator 120. The reference voltage on line 118 is used by the comparator 120 to determine when to activate the SCR 36. The negative input line 14 serves as a ground reference for lines 105 and 118.

Comparator 120 includes an operational amplifier (op amp) 126, a voltage divider network including resistors 124 and 125, a biasing resistor 127, and a pull-up resistor 128. The reference voltage is coupled on line 118 to the non-inverting input terminal of op amp 126. The resistance of resistor 127 is selected to provide proper biasing voltage here. Op amp 126 is powered by the supply voltage on line 105. Resistors 124 and 125 operate as a voltage divider to provide a preselected fraction of the output voltage to the inverting terminal of op amp 126 through diode 90. The resistance of resistors 124 and 125 and the level of the reference voltage 105 are chosen so that the output of op amp 126 is high when power source 12 is operating normally. The output of op amp 126 is also normally pulled high through pull-up resistor 128.

An interruption of the power source 12 is detected when the voltage level of the signal from the divider network becomes less than the reference voltage on line 118. In particular, the output voltage of op amp 126 abruptly becomes low when the power source 12 is interrupted. This in turn activates the SCR 36 through a capacitor 142 and a transformer 140. The transformer 140 provides sufficient current to switch SCR 36.

The foregoing description has been limited to several specific embodiments of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. Apparatus for extending the hold-up time of an output voltage provided by a power source to a load, the output voltage appearing across positive and negative output lines, comprising:
   A. bulk capacitive storage unit;
   B. means for regulating the bulk capacitive storage unit to a voltage near its peak-voltage rating; and
   C. means for coupling the bulk capacitive unit to the power source and isolating the bulk capacitive unit from the load when the voltage provided by the power source is greater than a minimum operating voltage, and for otherwise coupling the bulk capacitive unit to the load.

2. Apparatus as in claim 1 wherein the apparatus provides the output voltage across positive and negative output lines, and the bulk capacitive storage unit comprises:
   i. first and second bulk capacitors, the first bulk capacitor coupled to the positive output line and the second bulk capacitor coupled to the negative output line.

3. Apparatus as in claim 1 wherein the coupling means comprises:
   i. a switch, disposed between the bulk capacitive storage unit and the load, and having a control input; and
   ii. control means, coupled to the switch control input, for closing the switch when the output voltage is less than the minimum operating voltage, and for otherwise opening the switch.

4. Apparatus as in claim 2 wherein the coupling means comprises:
   i. a switch, disposed between the first and second bulk capacitors, and having a control input; and
   ii. control means, connected to the switch control input, for closing the switch when the output voltage is less than a minimum operating voltage, and for otherwise opening the switch.

5. A voltage boost circuit comprising:
   A. a silicon controlled rectifier having an anode, cathode, and control input;
   B. a supply capacitor, having an output voltage across first and second output terminals;

C. first and second bulk capacitors, the first bulk capacitor disposed between the first terminal of the supply capacitor and the cathode of the rectifier, and the second bulk capacitor disposed between second terminal of the supply capacitor and the anode of the rectifier;

D. first and second regulator means for regulating the voltage on the first and second bulk capacitors; and E. a diode, disposed between the second terminal of the supply capacitor and the control input of the rectifier.

6. Apparatus as in claim 5 additionally comprising:

F. means for current limiting, coupled to the supply capacitor.

7. Apparatus as in claim 5 where the first regulator means limits the voltage on the first capacitor to a predetermined voltage greater than one-half the output voltage.

8. Apparatus as in claim 5 where the second regulator means limits the voltage on the second capacitor to a predetermined voltage greater than one-half the output voltage.

9. A voltage boost circuit comprising:

A. supply capacitor means for providing an output voltage across positive and negative output terminals;

B. a bulk capacitive storage unit;

C. regulating means, for charging the bulk capacitor to a regulated voltage; and D. coupling means, for coupling the bulk capacitor to the regulating means while the output voltage is greater than a predetermined minimum operating voltage, and for otherwise coupling the bulk capacitor to the positive and negative output terminals.

10. A method of providing an extended hold-up time in the event of an interruption of the operation of a power source, the method comprising the steps of:

A. attaching a supply capacitor across terminals of the power source to provide an output voltage;

B. coupling a bulk capacitor to the power source but isolated from the supply capacitor, to charge the bulk capacitor;

C. regulating the bulk capacitor voltage;

D. detecting an interruption in the operation of the power source; and

E. coupling the bulk capacitor to provide the output voltage when the voltage on the supply capacitor is lower than a predetermined minimum operating voltage.

* * * * *